United States Patent [19]
Davis et al.

[11] Patent Number: 4,880,513
[45] Date of Patent: Nov. 14, 1989

[54] METHOD AND APPARATUS FOR GENERATING ACID AND BASE REGENERANTS AND THE USE THEREOF TO REGENERATE ION-EXCHANGE RESINS

[75] Inventors: Thomas A. Davis, Annandale; Donald J. Butterworth, Stirling, both of N.J.

[73] Assignee: The Graver Company, Union, N.J.

[21] Appl. No.: 876,911

[22] Filed: Jun. 20, 1986

[51] Int. Cl.$^4$ .................. B61D 15/06; B61D 13/02; C02F 13/42
[52] U.S. Cl. ........................... 204/182.4; 204/301; 210/670
[58] Field of Search ............... 204/182.3, 182.4, 182.5, 204/301, 98, 103, 237, 238, 239; 210/670, 672, 673, 677, 678

[56] References Cited

U.S. PATENT DOCUMENTS

| | | |
|---|---|---|
| 2,829,095 | 4/1958 | Oda et al. . |
| 3,074,863 | 1/1963 | Jasionowski ............... 204/235 X |
| 3,547,810 | 12/1970 | Cooper .................. 204/182.5 X |
| 3,654,104 | 4/1972 | Yoshida et al. ................. 204/98 |
| 3,704,218 | 11/1972 | Kato et al. . |
| 3,705,846 | 12/1972 | Kato et al. . |
| 4,024,043 | 5/1977 | Dege . |
| 4,082,835 | 4/1978 | Chlanda et al. . |
| 4,107,015 | 8/1978 | Chlanda et al. . |
| 4,219,396 | 8/1980 | Gaucy et al. . |
| 4,225,412 | 9/1980 | Reiss . |
| 4,256,552 | 3/1981 | Sweeney . |
| 4,308,117 | 12/1981 | Sweeney . |
| 4,311,771 | 1/1982 | Walther . |
| 4,334,968 | 6/1982 | Sweeney . |
| 4,389,298 | 6/1983 | Pelleari . |
| 4,391,680 | 7/1982 | Mani et al. . |
| 4,417,960 | 11/1983 | Pellegri . |
| 4,425,214 | 1/1984 | Pellegri . |
| 4,465,579 | 8/1984 | Mataga et al. . |
| 4,525,259 | 6/1985 | Hom et al. . |

FOREIGN PATENT DOCUMENTS

| | | |
|---|---|---|
| 143582 | 6/1985 | European Pat. Off. . |
| 1432020 | 4/1976 | United Kingdom . |
| 2122543 | 1/1984 | United Kingdom . |

OTHER PUBLICATIONS

Bipolar Membrane Technology, Kang-Jen Liu et al. (1983).
Basic Principles and Calculations in Chemical Engineering, 3rd ed., David M. Himmelblau (1962).
Membrane Electrodialysis Process for Recovery of Sulphur Dioxide from Power Plant Stack Gases, Kang-Jen Liu et al., Journal of Membrane Science (1983).
Use of Biopolar Membranes for Generation of Acid and Base—an Engineering and Economic Analysis, K. Nagasubramonian et al., Journal of Membrane Sciences (1977).
Application of Bipolar Membrane Technology: A Novel Process for Control of Sulphur Dioxide from Flue Gases, Journal of Membrane Science, Kong-Jen Liu, (1978).
Conversion of Hydroxylamine Hydrochloride to Hydroxylamine Nitrate by Electrodialysis and Water-Splitting Processes; Yuehsiung Chang, et al., Ind. Eng. Chem Process Dev. (1981).
Overview: Past, Present and Future Ionic Conducting Polymers, Harry P. Gregor (1983).
Investigation of the Electrochemical Properties of Commercial Bipolar Membranes (1974).
Membrane and Ultrafiltration Technology Recent Advances (1980) pp. 195–197.
Bipolar Membrane Technology, Kang-Jen Liu et al. (1983)

Primary Examiner—John F. Niebling
Assistant Examiner—John S. Starsiak, Jr.
Attorney, Agent, or Firm—Dressler, Goldsmith, Shore, Sutker & Milnamow

[57] ABSTRACT

A method and apparatus for generating acid and base regenerant solutions by utilization of a bipolar membrane electrodialysis stack. A mineral-containing salt solution is continuously circulated through the stack to produce a partially demineralized salt solution, an acid solution and a base solution. The acid solution and base solution are continuously circulated through the stack to increase the concentration thereof. The circulating salt solution is controlled to maintain the salt concentration in the range of 2% to 25% and the pH in the range of 8–11. The concentrations of the circulating acid solution and base solution are controlled to maintain the concentrations thereof in the range of 0.2N to 3.0N. The concentrated acid solution and base solution are utilized to regenerate exhausted ion-exchange resins.

73 Claims, 2 Drawing Sheets

METHOD AND APPARATUS FOR GENERATING ACID AND BASE REGENERANTS AND THE USE THEREOF TO REGENERATE ION-EXCHANGE RESINS

BACKGROUND OF THE INVENTION

The present invention is generally directed to an improved method and apparatus for generating acid and base solutions by electrodialysis of a salt solution and more particularly to an improved method and apparatus for the in-situ regeneration of exhausted ion-exchange resins.

Water treatment systems containing anion and cation exchange resins have many industrial applications. A primary application of such systems is in the purification of water for condensate recirculation systems used to drive steam turbines. During the service cycle of such systems the ion exchange resins become exhausted and must be regenerated prior to return for use in a subsequent service cycle. It is conventional to regenerate the cation exchange resin with a strong acid, such as hydrochloric acid, and to regenerate the anion exchange resin with a strong base, such as sodium hydroxide. It is the customary practice to purchase and store large quantities of regenerant acid and base for use in such systems.

It is well known in the art that acid and base solutions may be generated from a salt solution by either an electrolysis process or by an electrodialysis water splitting process. In the electrolysis process the generation of acid and base solutions is achieved through the use of electrode reactions in a system which consists of two electrodes, a cation-selective membrane, an anion-selective membrane, and a porous diaphragm through which a salt solution is pumped. In contrast, the electrodialysis process consists of a stack containing cation-selective membranes, bipolar membranes, anion-selective membranes, and electrodes at the end of the stack. The electrolysis unit requires a set of electrodes for each unit cell. Whereas, the stack utilized in the electrodialysis unit contains a large number of spaced apart membranes assembled between a single set of electrodes. Costs of electrodes and the electrical connections needed for electrolysis process are therefore significantly higher than for the electrodialysis process. Additionally, electrodiaytic water splitting is energetically a much more efficient process than electrolysis because it eliminates the over voltages associated with gas evolution at the electrodes.

In view thereof, the method and apparatus of the present invention utilizes an electrodialysis process to directly split a salt solution to generate acid and base solutions.

The process is conceptually a simple one and can be represented by the equation:

$$MX \text{ (Salt)} + H_2O \rightarrow HX \text{ (Acid)} + MOH \text{ (Base)}.$$

To effect and maintain separation of the various species, ion exchange membranes are used. The most crucial of these is the bipolar membrane, so called because it is composed of two distinct parts which are selective to ions of opposite charge. Under the influence of an applied direct current, such a sandwich membrane is capable of forcibly dissociating water to form equivalent amounts of hydrogen and hydroxyl ions. When used in conjunction with other cation-selective and anion selective (monopolar) membranes, the assembly constitutes an economical water splitting apparatus that generates acid and base solutions.

Literature on the use of bipolar membrane water splitting to generate acid and base solutions dates back at lease to the mid-fifties. A good discussion of this process is presented in a paper entitled *Use of Bipolar Membranes for Generation of Acid and Base—an Engineering and Economic Analysis* by K. Nagasubramanian, F. P. Chlanda, and Kang-Jen Liu, Journal of Membrane Science, 2 (1977) 109–124, and in U.S. Pat. Nos. 3,705,846, 4,024,043, 4,082,835, 4,219,396 and 4,311,771, the discussion in which paper and patents are hereby incorporated by reference.

SUMMARY OF THE INVENTION

The present invention is directed to a unique method and apparatus for generating acid and base solutions by utilization of bipolar membrane water splitting. The acid and base solutions are generated on site to regenerate exhausted ion exchange resins. In so doing, the invention eliminates the necessity to store large quantities of acid and base regenerants. Further, in accordance with one aspect of the invention, the spent regenerants may be recycled through the system and thereby reduces pollution associated with the discarding of the spent regenerants.

More specifically, the invention utilizes a multiplicity of such cells clamped between a pair of electrodes in an electrodialysis stack in which the separating unit of each cell includes a bipolar membrane, an anion exchange membrane and a cation exchange membrane. A salt solution, such as NaCl, is demineralized as it is directed between the anion exchange membrane and the cation exchange membrane. The depleted salt stream is preferrably recycled back through the stack. The $Cl^-$ ions and $H^+$ ions generated at the bipolar membrane form hydrochloric acid (HCl) which is directed to an acid receiving tank. The $Na^+$ and the $OH^-$ ions generated at the bipolar membrane form sodium hydroxide (NaOH) which is directed to a base receiving tank. The acid and base solutions from the respective receiving tanks are preferrably recycled through the stack for further concentration. When the acid and base solutions reach a predetermined concentration, e.g. 1N, they are directed from their respective receiving tanks to either a corresponding bulk storage tank or directly to a bed of exhausted ion exchange resin to regenerate the resin.

In accordance with a preferred embodiment of the invention, a salt solution having approximately a 10% concentration is continuously recirculated through the stack. The conductivity of the recirculated salt solution is monitored, and when the conductivity drops below a preselected set point corresponding to such concentration, a portion of the recirculating salt solution is directed through a saturated salt tank until the concentration of the recirculating salt solution reaches the desired concentration. The stream from the saturated salt tank is preferrably directed through a softener containing chelating resins to remove multi-valent ions, such as $Ca^+$ and $Mg^+$ and other contaminants that might percipitate in the base solution, prior to entry into the recirculating salt stream.

In accordance with a preferred embodiment of the invention, the generated acid and base solutions are continuously circulated from their respective receiving tanks through the stack to increase their concentration.

It has been determined that the quality of the acid and base deteriorates when the concentrations of the recirculated streams directed through the stack are increased in range of 0.2N to 3.0N concentration. Therefore, when the acid and base solutions reach a preselected concentration in such range, portions of the acid and base solutions from the respective receiving tanks are drained and directed to the corresponding bulk storage tanks, and the receiving tanks are filled with demineralized water to reduce the concentration thereof. In order to simplify the process, the draining of the acid and base solutions from the receiving tanks is controlled by monitoring the conductivity of the recirculating base solution. When the conductivity reaches a predetermined set point corresponding to the preselected concentration, both the acid and base receiving tanks are drained and then filled with demineralized water.

In accordance with a preferred embodiment of the invention, a base solution from the base receiving tank is continuously recirculated through the anode and cathode compartments of the stack to maintain electrical conductivity between the electrodes and the membranes. The effluent from the anode compartment is directed through a first gas/liquid separator to remove entrained oxygen therefrom prior to its return to the base receiving tank. The effluent from the cathode compartment is directed through a second gas/liquid separator to remove entrained hydrogen therefrom prior to its return to the base receiving tank.

In accordance with a preferred embodiment of the invention, the exhausted ion-exchange resin may be regenerated with acid and/or base solutions delivered either from the respective receiving tank or from the respective bulk storage tanks. The spent regenerants and the rinse water may be either returned to the system or discarded as waste.

In accordance with another preferred embodiment of the invention, the concentration of the circulating salt solution is controlled by directing a predetermined quantity of saturated brine into the salt circulation tank in response to the withdrawal of base solution from the base receiving tank.

DESCRIPTION OF PREFERRED EMBODIMENTS

Figure 1:
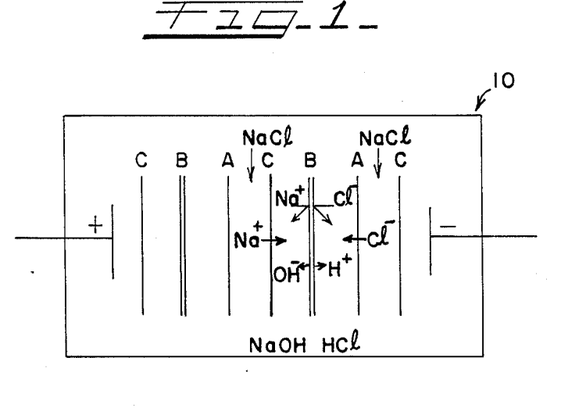
FIG. 1 is a schematic representation of an electrodialysis water spitting stack of the type utilized in the present invention.

Referring to FIG. 1, a schematic representation is shown of a typical arrangement utilizing a bipolar membrane (B) as a water-splitter in an electrodialysis cell. Acid (HCl) and base (NaOH) solutions are formed and flow through compartments on opposite sides of the bipolar membrane, which are also bounded by anion permeable ion exchange membranes (A) and cation permeable ion exchange membranes (C). A depleted salt solution (NaCl) passes through the adjacent compartments between membranes A and C. Under the influence of a direct current, anions (Cl$^-$) and cations (Na$^+$) within the bipolar membrane migrate out of the membrane toward the anode and cathode electrodes, respectively, and in the vicinity of the interface their concentration rapidly decline. At this point continued passage of the electric current can only occur by the transfer of OH$^-$ and H$^+$ ions produced by the dissociation of water (water splitting) at the interface. A large number of such cells are typically assembled to form an electrodialysis stack, of well known design and construction. Direct current input to the stack is made via the two electrodes at the ends of the stack.

The present invention is directed to improved methods and apparatus which utilize an electrodialysis stack for generation of acid and base regenerants for use in regenerating exhausted ion-exchange resins. The description of the preferred embodiments of the invention which hereinbelow follows shall be made in conjunction with the splitting of a NaCl salt solution to generate an acid HCl solution and a base NaOH solution. However, it will be appreciated that the selection of other salt solutions may be made to generate different acid and base solutions.

Figure 2:
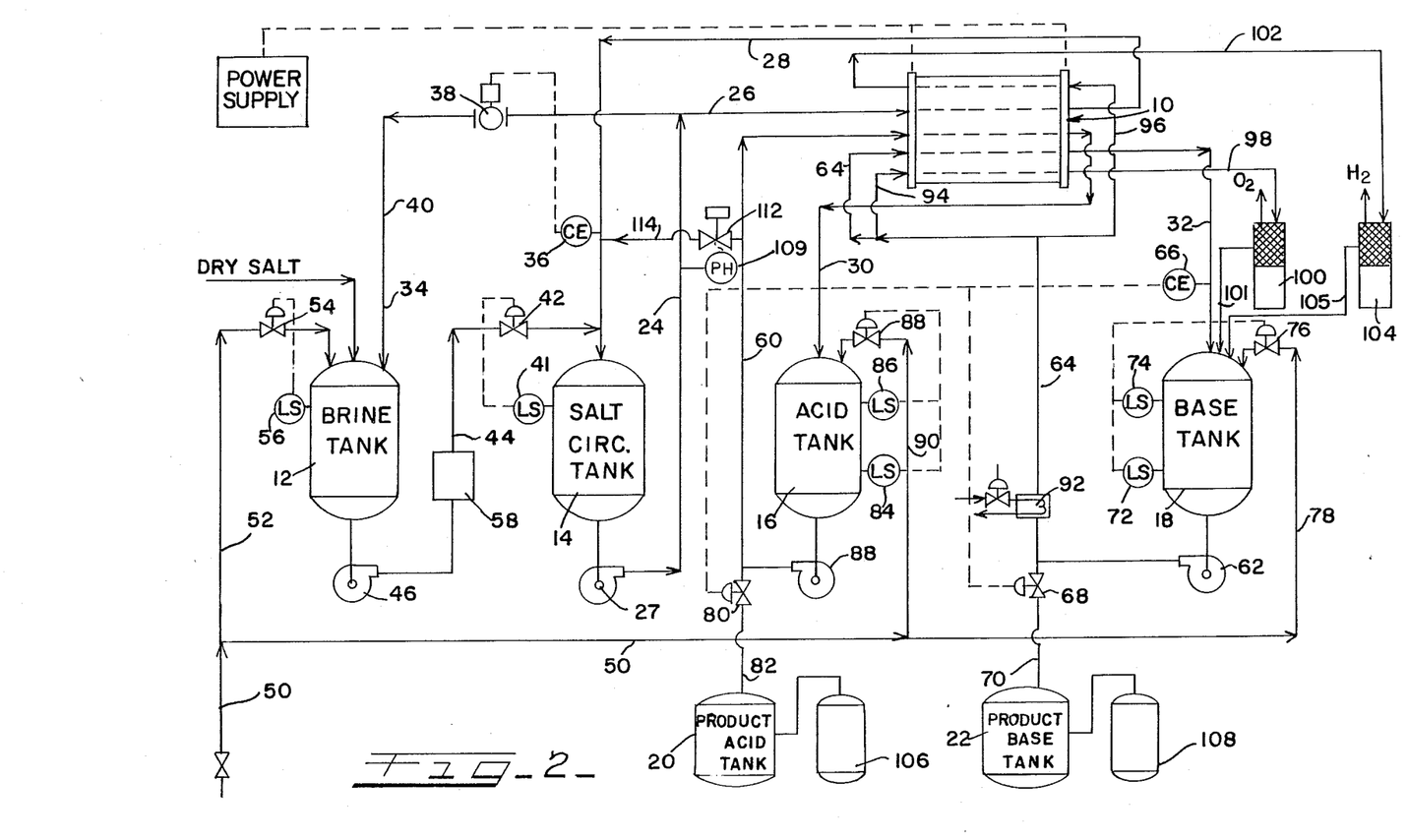
FIG. 2 is a schematic representation of a preferred embodiment of a system utilizing the principles of the present invention.

The method and apparatus in accordance with a first preferred embodiment of the invention will now be described by reference to a schematic representation thereof as shown in FIG. 2. The system for generating acid and base solutions comprises an electrodialytic water-splitting stack 10, a saturated salt solution or brine tank 12, a salt solution circulating tank 14, an acid receiving tank 16, a base receiving tank 18, an acid product tank 20 and a base product tank 22. Stack 10 is preferably of the type which utilizes a bipolar membrane as discussed hereinabove with regards to FIG. 1, an example of which is manufactured by Allied Corporation under the trademark Aquatech.

A NaCl salt solution from tank 14 is continuously circulated from tank 14 into the compartments defined between the anion and cation membranes of the stack 10 via line 24 and line 26 by salt circulation pump 27. The partially demineralized salt solution from the compartments defined between the anion and cation membranes of the stack 10 is circulated back into tank 14 via line 28. The acid HCl solution generated in the compartments between the anion membranes and the bipolar membranes of the stack 10 is directed into acid receiving tank 16 via line 30. The base NaOH solution generated in the compartments between the cation membranes and the bipolar membranes of the stack 10 is directed into base receiving tank 18 via line 32.

It has been determined that the efficiency of the stack is maximized when the concentration of the entering salt solution is in the range of 2% to 25% and preferably approximately 10%. In accordance with one aspect of the present invention, the concentration of the circulating salt solution is maintained substantially at a preselected level, i.e. a 10% concentration, by a unique control system. The control system includes a brine tank 12 into which crystalline salt is added via line 34 so as to maintain a saturated brine solution therein. The concentration of the circulating salt solution is monitored by a conductivity monitor 36 which detects the conductivity of the circulating salt solution in a well known manner. The conductivity monitor 36 detects when the conductivity of the circulating salt solution drops below a predetermined value, which value corresponds to the conductivity of the salt solution at the predetermined concentration level, i.e. about 130 mS/cm. for a 10% salt concentration at room temperature. Conductivity monitor 36 is operative to open and close a control valve 38 in line 40 which communicates with line 24 to direct a portion of the depleted circulating salt solution into the brine tank 12. In so doing, the liquid level in tank 14 drops until it activates a level switch 41 associated with tank 14, which switch opens a valve 42 in line 44 communicating tank 12 with line 28 and activates a salt make-up pump 46 so as to direct saturated brine from tank 12 through line 44 into tank 14. As the liquid level in tank 14 rises to the elevation of level switch 41, the valve 42 is closed and pump 46 is shut down so as to terminate the transfer of saturated brine into tank 14. This cycle continues until the concentration of the circulated salt solution measured by the conductivity cell 36 reaches the predetermined value, i.e. 130 mS/cm.

In accordance with a preferred embodiment of the invention, a volume of saturated brine, i.e. approximately 25% salt concentration, is maintained in tank 12. Dry crystalline salt is periodically added to tank 12 through line 34 so as to maintain a volume of crystalline salt at the bottom of tank 12. Demineralized water from a suitable source (not shown) is directed into the system through a line 50. In order to maintain a volume of brine in tank 12, demineralized water is directed therein through line 52 and control valve 54 associated therewith. A level switch 56 associated with tank 12 opens and closes valve 54 so as to maintain a predetermined liquid level therein.

In accordance with a preferred embodiment of the invention, a brine softener 58 may be positioned in line 44. Brine softener 58 preferably contains chelating resins, such as for example Amberlite IRC-718, so as to remove multi-valent ions, such as calcium and magnesium ions, and other contaminants, from the brine solution being directed to tank 14. The pH of the circulating salt solution is preferably maintained in the range of 8 to 11 when the system includes a brine softener, in a manner which will be hereinbelow further discussed. Brine softener 58 may be periodically regenerated by sequentially directing acid and base generated in the system through the bed of chelating resins in a well known manner.

In accordance with an alternative embodiment of the invention, where the liquid level of the brine tank is lower than the liquid level of the salt recirculation tank, the level switch 41 and the valve 38 may be eliminated and replaced with an over flow line (not shown) which extends between tank 14 to tank 12 to maintain the liquid level in tank 14, and valve 42 may be eliminated or replaced with a check valve. In this embodiment, the conductivity cell 36 is operative to activate pump 46.

From the above discussion it will be appreciated that the circulating salt solution directed through stack 10 may be maintained at a predetermined concentration to maximize the efficiency of the water-splitting electrodialysis stack 10.

The acid solution from stack 10 is directed into acid receiving tank 16 and continuously circulated back through the compartments between the bipolar membranes and the anion exchange membranes of the stack via an acid recirculation pump 58 in acid recirculation line 60. The continuous circulation of the acid solution through the stack is effective to increase the concentration of the circulating acid solution.

Similarily, the base solution from stack 10 is directed into base receiving tank 18 and continuously circulated back through the compartments between the bipolar membranes and the cation exchange membranes of the stack via base recirculation pump 62 in base recirculation line 64. The continuous circulation of the base solution through the stack is effective to increase the concentration of the circulating base solution.

In accordance with the invention, it has been determined that the quality of the product acid and base is maximized if the concentration of the circulating, acid solution and the circulating base solution is controlled so as to be in the range of 0.2N to 3.0N and preferably in the range of 0.2N to 1N.

The concentration of the circulating base solution is monitored by a conductivity monitor 66, preferably in communication with line 32. Conductivity monitor 66 is activated when the conductivity of the circulating base solution through line 32 reaches a predetermined conductivity value, equivalent to the conductivity of the base solution at a predetermined concentration, i.e., 170 mS/cm. for a 1N NaOH solution. The activation of conductivity monitor 66 is effective to open a control valve 68 in base product line 70, to direct the base solution from tank 18 therethrough into product base tank 22. In so doing, the liquid level in base receiving tank 18 drops as the base solution therefrom is directed into base product tank 22. Base receiving tank 18 is preferably provided with a low level control switch 72 and a high level control switch 74. As the liquid level in tank 18 reaches switch 72, the switch is activated to close valve 68 and thereby terminate the flow of base solution into tank 22. Activation of switch 72 also opens a control valve 76 in line 78 so as to direct demineralized water from line 50 through line 78 into tank 18. The demineralized water entering tank 18 increases the liquid level therein until it reaches and activates switch 74 which is operative to close valve 76 and thereby terminate the flow of demineralized water into tank 18.

The concentration of the circulating acid solution may also be controlled by the conductivity monitor 66 due to the fact that the stack 10 generates equivalent volumes of acid and base solutions. Accordingly, in accordance with one embodiment of the invention, the activation of the conductivity 66 is also effective to open a control valve 80 in acid product line 82, to direct the acid solution from tank 16 therethrough into product acid tank 20. Acid receiving tank 16 is also preferably provided with a low level control switch 84 and a high level control switch 86. As the liquid level in tank 16 reaches switch 84, the switch is activated to close valve 80 and thereby terminate the flow of acid solution into tank 20. Activation of switch 84 also opens a control valve 88 in line 90 so as to direct demineralized water from line 50 through line 90 into tank 16. When the liquid level in tank 16 increases and reaches the level of switch 86, the switch is activated and closes valve 88 and thereby terminates the flow of demineralized water into tank 16.

As an alternative embodiment of the invention, if desired, a separate conductivity cell (not shown) may be provided to monitor the conductivity of the circulating acid solution and control the opening of valve 80 in a similar manner that conductivity cell 66 controls the operation of control valve 68.

In accordance with a preferred embodiment of the invention the temperature of the base solution circulated through the electrodialysis stack 10 may be maintained in range of 25° C. to 50° C. A suitable heat exchange means 92, of a well known type, is provided in line 92 to control the temperature of the circulating base solution in a suitable manner.

In order to maintain the electrical conductivity between the electrodes and the membranes, a portion of the circulating base solution is continuously circulated through the anode compartment and the cathode compartment to rinse the compartments. A portion of the circulating base solution is directed into the anode compartment through line 94 and into the cathode compartment through line 96. The base solution exiting from the anode compartment is directed through line 98 into a suitable gas/liquid separator 100 to remove entrained oxygen gas therefrom before it is returned via line 101 to tank 18. The base solution exiting from the cathode compartment is directed through line 102 into a suitable gas/liquid separator 104 to remove entrained hydrogen gas therefrom before it is returned via line 105 to tank 18. Alternatively, a separate electrode rinse tank and pump may be employed. The electrode rinse as hereinabove discussed simplifies the system by eliminating the necessity of a separate rinse tank and electrode rinse pump and reduces piping costs.

The product acid directed into tank 20 and the product base directed into tank 22 may be utilized to respectively regenerate an exhausted cation exchange resin in tank 106 and an exhausted anion exchange resin in tank 108, in a conventional manner. The waste regenerants from the tanks 106 and 108 may be either directed to waste or directed back into tank 12 to reduce the need for fresh salts after appropriate treatment to remove divalent cations. The rinse waters from the tanks 106 and 108 may be either directed to waste or directed respectively back into the acid and base circulating tanks. The acid and base regenerants may be similarly utilized to regenerate chelating resins used to remove multivalent ions from NaCl brines by first directing the acid regenerant therethrough followed by the base regenerant.

As alluded to hereinabove, the pH of the circulating salt solution is preferably maintained in the range of 1 to 11, and in the range of 8 to 11 when the system includes a brine softener. In accordance with the invention, the pH of the circulating salt solution is controlled by a pH monitoring device 109 in communication with line 24. When the pH of the circulating salt solution is detected by device 109 to be at a predetermined high level, i.e. 10, a value 112 is opened in line 114 to direct circulating acid solution from line 60 into the circulating salt solution. When the pH returns to the predetermined level, the value 112 is closed. Although not shown in FIG. 2, the device 109 may be similarly utilized to control the direction of circulating base solution from line 64 when the pH of the circulating salt solution falls below a predetermined low level, i.e. 8. In so doing, the pH of the circulating salt solution may be controlled to maximize the efficiency of the system.

Figure 3:
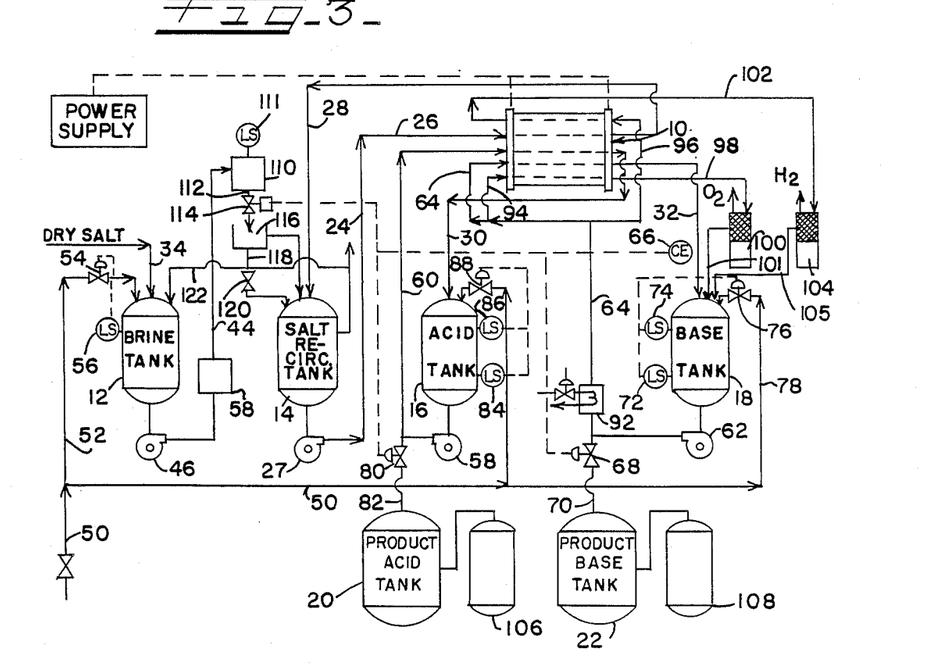
FIG. 3 is a schematic representation of an alternative preferred embodiment of a system utilizing the principles of the present invention.

Referring to FIG. 3, an alternative embodiment of the invention is schematically depicted, wherein the concentration of the circulating salt solution is controlled by directing a predetermined quantity of saturated brine into the salt circulation tank in response to the withdrawal of the base solution from the base receiving tank. In order to simplify the disclosure of the system of this alternative embodiment, the same reference numerals shall be used to identify corresponding compenents to those in the embodiment of the invention shown in FIG. 2. Also, the disclosure with regards to the function and operation of the common components is hereby incorporated by reference.

Referring to FIG. 3, the saturated salt solution from tank 12 is directed by pump 46 through line 44 into a brine metering tank 110, having a high level switch 111 associated therewith. Switch 111 is operable to control pump 46 so as to maintain a predetermined volume of saturated brine in tank 110. The predetermined volume of saturated brine from tank 110 is periodically directed through line 112, having a control value 114 associated therewith, into a brine surge tank 116. The saturated brine from surge tank 116 is slowly released through line 118, having a valve 120 associated therewith, into salt solution circulation tank 14. Tank 14 is provided with an overflow line 122 to control the upper level of circulating salt solution in tank 14 and direct any excess into brine tank 12.

The saturated brine solution from tank 110 is dumped into tank 116 and released into tank 14 upon the opening of control valve 114. Valve 114 is controlled by conductivity monitor 66 such that it is opened and closed with valves 68 and 80 each time that the base solution and acid solution is withdrawn respectively from tanks 18 and 16. The volume of saturated salt solution in tank 110 is preselected so as to maintain the desired concentration of the circulating salt solution in the range as hereinabove discussed. In all other respects the system as depicted in FIG. 3 operates as discussed hereinabove with respect to the system as depicted in FIG. 2.

While the present invention has been described with reference to several specific embodiments, it will be understood that all of the equivalent forms or ramifications thereof are also contemplated. For example, the withdrawal of the acid solution and base solution from the respective receiving tanks can be accomplished by a controlled timing sequence rather than by monitoring the concentrations thereof. Further, the salt concentration of the circulating mineral-containing salt solution may be controlled by removing water therefrom. Also, the relative concentrations of the circulating acid solution and base solution may be altered by adjustment of the level switches associated with the respective receiving tanks or by altering the frequency of withdrawal of the respective solutions. Moreover, the words used are words of description rather than of limitation, and various changes can be made without departing from the spirit or scope of the invention disclosed herein.

What is claimed is:

1. A method for generating an acid solution and a base solution by electrodialysis of a salt solution, comprising:

(a) continuously circulating a mineral-containing salt solution through an electrodialysis stack means to produce a partially demineralized salt solution, an acid solution and a base solution;

(b) directing the acid solution to an acid receiving tank;

(c) directing the base solution to a base receiving tank;

(d) directing the partially demineralized salt solution from the electrodialysis stack means back through the electrodialysis stack means as the circulating mineral-containing salt solution;

(e) monitoring the salt concentration of the circulating mineral-containing salt solution;

(f) directing a portion of the circulating mineral-containing salt solution through a salt tank containing a saturated salt solution when the salt concentration of the circulating mineral-containing salt solution drops below a predetermined level; and (g) directing the solution from the salt tank into the circulating mineral-containing salt solution to increase the salt concentration thereof.

2. The method as defined in claim 1 wherein the circulating mineral-containing salt solution passes through a salt solution circulating tank such that upon initiation of step (f) the liquid level therein drops below a predetermined level.

3. The method as defined in claim 2 wherein the salt concentration of the circulating mineral-containing salt solution is determined by monitoring the conductivity of the circulating salt solution from the electrodialysis stack means.

4. The method as defined in claim 3 wherein step (f) is initiated when, the conductivity of the circulating salt solution is equal to the conductivity of a salt solution having a preselected salt concentration in the range of 2% to 25%.

5. The method as defined in claim 4 wherein step (f) is initiated when the conductivity of the circulating salt solution is approximately equal to the conductivity of a 10% salt solution.

6. The method as defined in claim 2 wherein the initiation of step (g) is effective to increase the liquid level in the salt solution circulating tank until it reaches the predetermined level whereupon steps (f) and (g) are terminated.

7. The method as defined in claim 3 wherein the predetermined level in the salt solution circulating tank is detected by a level switch associated therewith.

8. The method as defined in claim 1 wherein the electrodialysis stack means includes a bipolar membrane.

9. The method as defined in claim 1 wherein crystalline salt is periodically added to the salt tank to maintain a quantity of crystalline salt therein and thereby maintain the salt solution therein in a substantially saturated state.

10. The invention as defined in claim 1 wherein the acid solution from the acid receiving tank and the base solution from the base receiving tank is circulated through the electrodialysis stack means to increase the concentration thereof.

11. The invention as defined in claim 1 further including monitoring the concentration of the acid solution entering the acid receiving tank and/or the base solution entering the base receiving tank and periodically withdrawing acid solution from the acid receiving tank and base solution from the base receiving tank when the concentration of either the base solution or the acid solution reaches a predetermined level.

12. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) periodically directing a predetermined quantity of a substantially saturated salt solution into the circulating mineral-containing salt solution when the concentration of either the base solution and/or the acid solution reaches a predetermined level so as to maintain the salt concentration thereof in the range of 2% to 25%;
(e) directing the partially demineralized salt solution from the electrodialysis stack means back through the electrodialysis stack means as the circulating mineral-containing salt solution;
(f) circulating the base solution from the base receiving tank through the electrodialysis stack means and back into the base receiving tank to increase the concentration thereof;
(g) circulating the acid solution from the acid receiving tank through the electrodialysis stack means and back into the acid receiving tank to increase the concentration thereof;
(h) monitoring the concentration of the base solution entering the base receiving tank and/or the acid solution entering the acid receiving tank;
(i) periodically withdrawing the acid solution from the acid receiving tank and the base solution from the base receiving tank when the concentration of the base solution and/or acid solution reaches a predetermined level;
(j) terminating the withdrawal of the acid solution and base solution in step (i); and
(k) directing water into the corresponding receiving tanks to reduce the concentration of the circulating acid solution and the circulating base solution.

13. The method as defined in claim 12 wherein the acid solution withdrawn from the acid receiving tank is directed to a product acid tank and the base solution withdrawn from the base receiving tank is directed to a product base tank.

14. The method as defined in claim 13 wherein the concentration monitored in step (h) is determined by measuring the conductivity of the acid solution and/or the base solution from the electrodialysis stack means.

15. The method as defined in claim 14 wherein step (i) is initiated when the conductivity of the acid solution and/or base solution is approximately equal to the conductivity of a solution thereof having a concentration in the range of 0.2N to 3.0N.

16. The method as defined in claim 14 wherein step (j) is initiated when the conductivity of the acid solution and/or base solution is approximately equal to the conductivity of a 1N solution thereof.

17. The method as defined in claim 13 wherein the acid solution and the base solution, withdrawn in step (i) is terminated in step (j) when the liquid level in the corresponding receiving tank reaches a low predetermined level.

18. The method as defined in claim 17 wherein the predetermined low level and the predetermined high level in the acid receiving tank and the base receiving tank are detected by a low level switch and a high level switch associated therewith.

19. The method as defined in claim 15 wherein the water directed into the corresponding acid and base receiving tanks is terminated when the liquid level therein reaches a predetermined high level.

20. The method as defined in claim 12 wherein the base solution circulated through the electrodialysis stack means passes through a heat exchanger means to maintain the temperature thereof in the range of 25° C. to 50° C.

21. The method as defined in claim 12 wherein the electrodialysis stack means includes a bipolar membrane.

22. The method as defined in claim 12 wherein the saturated salt solution is slowly metered into the circulating mineral-containing salt solution.

23. The method as defined in claim 12 wherein step (j) precedes step (k).

24. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) directing the partially demineralized salt solution from the electrodialysis stack means back through the electrodialysis stack means as the circulating mineral-containing salt solution;
(e) directing a portion of the circulating mineral-containing salt solution through a salt tank containing a saturated salt solution;
(f) directing the solution from the salt tank into the circulating mineral-containing salt solution;
(g) continuously circulating base solution from the base receiving tank through the anode and cathode electrode compartments of the electrodialysis stack means to maintain electrical conductivity between the electrodes and the membranes of the electrodialysis stack means;
(h) directing the base solution from the anode compartment of the electrodialysis means through a gas/liquid separator means to remove entrained oxygen therefrom prior to return thereof to the base receiving tank; and
(i) directing the base solution passing through the cathode compartment of the electrodialysis means through a gas/liquid separator means to remove entrained hydrogen therefrom prior to return thereof to the base receiving tank.

25. The method as defined in claim 23 wherein the acid solution from the acid receiving tank is circulated through the electrodialysis stack means to increase the concentration thereof.

26. A method as defined in claim 25 further comprising:
(h) rinsing the ion-exchange resin to recover a portion of the acid regenerant or the base regenerant and directing the recovered acid regenerant and the recovered base regenerant back into the corresponding acid receiving tank or the base receiving tank.

27. The method as defined in claim 25 further comprising:
(h) monitoring the concentration of the acid solution entering the acid receiving tank and/or the base solution entering the base receiving tank; and
(i) periodically withdrawing acid solution from the acid receiving tank for use as the acid regenerant and base solution from the base receiving tank for use as the base regenerant when the concentration of either the base solution or the acid solution reaches a predetermined level.

28. The method as defined in claim 27 wherein the acid solution withdrawn from the acid receiving tank is directed to an acid storage tank and the base solution withdrawn from the base receiving tank is directed to a base storage tank.

29. The method as defined in claim 27 wherein the concentration monitored in step (h) is determined by measuring the conductivity of the acid solution and/or the base solution from the electrodialysis means.

30. The method as defined in claim 28 wherein step (i) is initiated when the conductivity of the acid solution and/or the base solution is approximately equal to the conductivity of a 1 N solution thereof.

31. The method as defined in claim 28 wherein step (i) is initiated when the conductivity of the acid solution and/or the base solution is approximately equal to the conductivity of a solution thereof having a concentration in the range of 0.2N to 3.0N.

32. The method as defined in claim 27 wherein the acid solution and the base solution withdrawn in step (i) is terminated when the liquid level in the corresponding receiving tank reaches a predetermined low level.

33. The method as defined in claim 31 wherein, upon termination of the withdrawal of the acid solution and the base solution, a liquid is directed into the corresponding receiving tanks to reduce the concentration of the circulating acid solution and the circulating base solution.

34. The method as defined in claim 32 wherein the liquid includes demineralized water.

35. The method as defined in claim 32 further comprising:
(j) rinsing the ion-exchange resin to recover a portion of the acid regenerant or the base regenerant and wherein the liquid includes the acid regenerant or the base regenerant.

36. The method as defined in claim 32 wherein the liquid directed into the corresponding acid and base receiving tanks is terminated when the liquid therein reaches a predetermined high level.

37. The method as defined in claim 24 wherein the base solution circulated through the electrodialysis stack means passes through a heat exchanger means to maintain the temperature thereof in the range of 25° C. to 50° C.

38. A method for regenerating an ion-exchange resin, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) directing the partially demineralized salt solution from the electrodialysis stack means back through the electrodialysis stack means as the circulating mineral-containing salt solution;
(e) monitoring the salt concentration of the circulating mineral-containing salt solution;
(f) directing a portion of the circulating mineral-containing salt solution through a salt tank containing a saturated salt solution when the salt concentration of the circulating mineral-containing salt solution drops below a predetermined level;
(g) directing the solution from the salt tank into the circulating mineral-containing salt solution to increase the salt concentration thereof; and
(h) contacting a regeneratable ion-exchange resin with an effective amount of acid regenerant delivered from the acid receiving tank or base regenerant delivered from the base receiving tank, or both, to regenerate the ion-exchange resin and thereby produce a salt-containing waste regenerant.

39. The method as defined in claim 38 wherein the circulating mineral-containing salt solution passes through a salt solution circulating tank such that upon initiation of step (f) the liquid level therein drops below a predetermined level.

40. The method as defined in claim 39 wherein the initiation of step (g) is effective to increase the liquid level in the salt solution circulating tank until it reaches the predetermined level whereupon steps (f) and (g) are terminated.

41. The method as defined in claim 40 wherein the concentration of the salt in the circulating mineral-containing salt solution is determined by monitoring the conductivity of the partially demineralized salt solution from the electrodialysis stack means.

42. The method as defined in claim 38 wherein step (f) is initiated when the conductivity of the circulating salt solution is equal to the conductivity of a salt solution having a preselected salt concentration in the range of 2% to 25%.

43. The method as defined in claim 38 wherein step (f) is initiated when the conductivity of the circulating salt solution is approximately equal to the conductivity of a 10% salt solution.

44. The method as defined in claim 38 wherein the salt-containing waste regenerant is directed into the salt tank.

45. The method as defined in claim 38 wherein the solution from the salt tank in step (g) passes through a softener to remove multi-valent ions therefrom.

46. The method as defined in claim 45 wherein the softener contains chelating resins.

47. The method as defined in claim 46 wherein the pH of the circulating mineral-containing salt solution is maintained substantially in the range of 8 to 11.

48. The method as defined in claim 46 wherein the chelating resins are periodically regenerated by directing previously produced acid solution and base solution therethrough.

49. The method as defined in claim 38 wherein the electrodialysis stack means includes a bipolar membrane.

50. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) maintaining a supply of saturated salt solution in a salt tank containing a quantity of crystalline salt;
(e) directing saturated salt solution from the salt tank into a salt metering tank;
(f) maintaining a predetermined quantity of saturated salt solution in the salt metering tank;
(g) directing the predetermined quantity of a substantially saturated salt solution from the salt metering tank into the circulating mineral-containing salt solution so as to maintain the salt concentration thereof in the range of 2% to 25%;
(h) directing the partially demineralized salt solution from the electrodialysis stack means back through the electrodialysis stack means as the circulating mineral-containing salt solution;
(i) circulating the base solution from the base receiving tank through the electrodialysis stack means and back into the base receiving tank to increase the concentration thereof;
(j) circulating the acid solution from the acid receiving tank through the electrodialysis stack means and back into the acid receiving tank to increase the concentration thereof;
(k) monitoring the concentration of the base solution entering the base receiving tank and/or the acid solution entering the acid receiving tank;
(l) periodically withdrawing the acid solution from the acid receiving tank and the base solution from the base receiving tank when the concentration of the base solution and/or acid solution reaches a predetermined level;
(m) terminating the withdrawal of the acid solution and base solution in step (l); and
(n) directing water into the corresponding receiving tanks to reduce the concentration of the circulating acid solution and the circulating base solution.

51. The method as defined in claim 50 further comprising:
(o) directing the saturated salt solution from the salt metering tank into a surge tank; and
(p) directing the saturated salt solution from the surge tank slowly into a salt solution circulating tank for mixing with the mineral-containing salt solution circulating therethrough.

52. The method as defined in claim 49 wherein steps (m)–(p) are initiated when the concentration of either the base solution and/or acid solution reaches the predetermined level.

53. The method as defined in claim 49 wherein the level of circulating mineral-containing salt solution in the salt solution circulating tank is maintained by directing excess solution therein back into the salt tank.

54. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) directing the partially demineralized salt solution from the electrodialysis stack means back through the electrodialysis stack means as the circulating mineral-containing salt solution;
(e) directing a portion of the circulating mineral-containing salt solution through a salt tank containing a saturated salt solution; and
(f) directing the solution from the salt tank into the circulating mineral-containing salt solution.

55. The method as defined in claim 54 wherein the solution from the salt tank in step (h) passes through a softener to remove multi-valent ions therefrom.

56. The method as defined in claim 55 wherein the softener contains chelating resins.

57. The method as defined in claim 56 wherein the pH of the circulating mineral-containing salt solution is maintained substantially in the range of 8 to 11.

58. The method as defined in claim 55 wherein the chelating resins are periodically regenerated by directing previously produced acid solution and base solution therethrough.

59. The method as defined in claim 54 further comprising:
(g) circulating base solution from the base receiving tank through the anode and cathode electrode compartments of the electrodialysis stack means to maintain electrical conductivity between the electrodes and the membranes of the electrodialysis stack means;
(h) directing the base solution passing through the anode compartment of the electrodialysis means through a gas/liquid separator means to remove entrained oxygen therefrom prior to return thereof to the base receiving tank; and
(i) directing the base solution passing through the cathode compartments of the electrodialysis means through a gas/liquid separator means to remove entrained hydrogen therefrom prior to return thereof to the base receiving tank.

60. The method as defined in claim 54 wherein the electrodialysis stack means includes a bipolar membrane.

61. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) passing a predetermined quantity of a substantially saturated salt solution through a softener to remove multi-valent ions therefrom and directing same into the circulating mineral-containing salt solution so as to maintain the salt concentration thereof in the range of 2% to 25%;
(e) directing the partially demineralized salt solution from the electrodialysis stack means back through the electrodialysis stack means as the circulating mineral-containing salt solution;
(f) circulating the base solution from the base receiving tank through the electrodialysis stack means and back into the base receiving tank to increase the concentration thereof;
(g) circulating the acid solution from the acid receiving tank through the electrodialysis stack means and back into the acid receiving tank to increase the concentration thereof;
(h) monitoring the concentration of the base solution entering the base receiving tank and/or the acid solution entering the acid receiving tank;
(i) periodically withdrawing the acid solution from the acid receiving tank and the base solution from the base receiving tank when the concentration of the base solution and/or acid solution reaches a predetermined level;
(j) terminating the withdrawal of the acid solution and base solution in step (i); and
(k) directing water into the corresponding receiving tanks to reduce the concentration of the circulating acid solution and the circulating base solution.

62. The method as defined in claim 61 wherein the softener contains chelating resins.

63. The method as defined in claim 62 wherein the pH of the circulating mineral-containing salt solution is maintained substantially in the range of 8 to 11.

64. The method as defined in claim 62 wherein the chelating resins are periodically regenerated by directing previously produced acid solution and base solution therethrough.

65. A method for regenerating an ion-exchange resin, comprising:
(a) continuously circulating a mineral-containing salt solution through an electrodialysis stack means to produce a partially demineralized salt solution, an acid solution and a base solution;
(b) directing the acid solution to an acid receiving tank;
(c) directing the base solution to a base receiving tank;
(d) directing the partially demineralized salt solution from the electrodialysis stack means back through the electrodialysis stack means as the circulating mineral-containing salt solution;
(e) directing a portion of the circulating mineral-containing salt solution through a salt tank containing a saturated salt solution;
(f) directing the solution from the salt tank into the circulating mineral-containing salt solution; and
(g) contacting a regeneratable ion-exchange resin with an effective amount of acid regenerant delivered from the acid receiving tank or base regenerant delivered from the base receiving tank, or both, to regenerate the ion-exchange resin and thereby produce a salt-containing waste regenerant.

66. The method as defined in claim 65 wherein the electrodialysis stack means includes a bipolar membrane.

67. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution, the partially demineralized salt solution being directed back through the electrodialysis stack means as the circulating mineral-containing salt solution;
(b) directing the acid solution to an acid receiving tank;
(c) directing the base solution to a base receiving tank;
(d) monitoring the pH of the circulating salt; and
(e) periodically directing acid solution from the acid receiving tank or base solution from the base receiving tank into the circulating mineral-containing salt solution so as to maintain the pH thereof in the range of approximately 1 to 11.

68. A method for generating an acid solution and a base solution by electrodialysis of a salt solution, comprising:
(a) continuously circulating a mineral-containing salt solution through an electrodialysis stack means to produce a partially demineralized salt solution, an acid solution and a base solution;

(b) directing the acid solution to an acid receiving tank;

(c) directing the base solution to a base receiving tank;

(d) directing a predetermined quantity of a substantially saturated salt solution into the circulating mineral-containing salt solution so as to maintain the salt concentration thereof in the range of 2% to 25%;

(e) directing the partially demineralized salt solution from the electrodialysis stack means back through the electrodialysis stack means as the circulating mineral-containing salt solution;

(f) circulating the base solution from the base receiving tank through the electrodialysis stack means and back into the base receiving tank to increase the concentration thereof;

(g) circulating the acid solution from the acid receiving tank through the electrodialysis stack means and back into the acid receiving tank to increase the concentration thereof;

(h) monitoring the concentration of the base solution entering the base receiving tank and/or the acid solution entering the acid receiving tank;

(i) periodically withdrawing the acid solution from the acid receiving tank and the base solution from the base receiving tank when the concentration of the base solution and/or acid solution reaches a predetermined level;

(j) terminating the withdrawal of the acid solution and base solution in step (i) when the liquid level in the corresponding receiving tank reaches a low predetermined level detected by a low level switch;

(k) directing water into the corresponding receiving tanks to reduce the concentration of the circulating acid solution and the circulating base solution; and (l) terminating the water directing into the corresponding acid and base receiving tanks when the liquid level therein reaches a predetermined high level detected by a high level switch.

69. A method for regenerating an ion-exchange resin, comprising:

(a) continuously circulating a mineral-containing salt solution through an electrodialysis stack means to produce a partially demineralized salt solution, an acid solution and a base solution;

(b) directing the acid solution to an acid receiving tank;

(c) directing the base solution to a base receiving tank;

(d) directing a quantity of a substantially saturated salt solution into the circulating mineral-containing salt solution so as to maintain the salt concentration thereof in the range of 2% to 25%;

(e) directing the partially demineralized salt solution from the electrodialysis stack means back through the electrodialysis stack means as the circulating mineral-containing salt solution;

(f) circulating the base solution from the base receiving tank through the electrodialysis stack means and back into the base receiving tank to increase the concentration thereof;

(g) circulating the acid solution from the acid receiving tank through the electrodialysis stack means and back into the acid receiving tank to increase the concentration thereof;

(h) monitoring the concentration of the base solution entering the base receiving tank and/or the acid solution entering the acid receiving tank;

(i) periodically withdrawing the acid solution from the acid receiving tank and the base solution from the base receiving tank when the concentration of the base solution and/or acid solution reaches a predetermined level;

(j) terminating the withdrawal of the acid solution and base solution in step (i) when the liquid level in the corresponding receiving tank reaches a low predetermined level detected by a low level switch;

(k) directing a liquid into the corresponding receiving tanks to reduce the concentration of the circulating acid solution and the circulating base solution; and (l) terminating the water directed into the corresponding acid and base receiving tanks when the liquid level therein reaches a predetermined high level detected by a high level switch;

(m) contacting a regeneratable ion-exchange resin with an effective amount of acid regenerant delivered from the acid receiving tank or base regenerant delivered from the base receiving tank, or both, to regenerate the ion-exchange resin and thereby produce a salt-containing waste regenerant.

70. A method for regenerating an ion-exchange resin, comprising:

(a) continuously circulating a mineral-containing salt solution through an electrodialysis stack means to produce a partially demineralized salt solution, an acid solution and a base solution;

(b) directing the acid solution to an acid receiving tank;

(c) directing the base solution to a base receiving tank;

(d) periodically directing a quantity of a substantially saturated salt solution into the circulating mineral-containing salt solution when the concentration of either the base solution and/or the acid solution reaches a predetermined level so as to maintain the salt concentration thereof in the range of 2% to 25%;

(e) directing the partially demineralized salt solution from the electrodialysis stack means back through the electrodialysis stack means as the circulating mineral-containing salt solution;

(f) circulating the base solution from the base receiving tank through the electrodialysis stack means and back into the base receiving tank to increase the concentration thereof;

(g) circulating the acid solution from the acid receiving tank through the electrodialysis stack means and back into the acid receiving tank to increase the concentration thereof;

(h) monitoring the concentration of the base solution entering the base receiving tank and/or the acid solution entering the acid receiving tank;

(i) periodically withdrawing the acid solution from the acid receiving tank and the base solution from the base receiving tank when the concentration of the base solution and/or acid solution reaches a predetermined level;

(j) terminating the withdrawal of the acid solution and base solution in step (i);

(k) directing a liquid into the corresponding receiving tanks to reduce the concentration of the circulating acid solution and the circulating base solution; and (l) contacting a regeneratable ion-exchange resin with an effective amount of acid regenerant delivered from the acid receiving tank or base regenerant delivered from the base receiving tank, or both, to regenerate the ion-exchange resin and thereby produce a salt-containing waste regenerant.

71. A method for regenerating an ion-exchange resin, comprising:
   (a) continuously circulating a mineral-containing salt solution through an electrodialysis stack means to produce a partially demineralized salt solution, an acid solution and a base solution;
   (b) directing the acid solution to an acid receiving tank;
   (c) directing the base solution to a base receiving tank;
   (d) maintaining a supply of saturated salt solution in a salt tank containing a quantity of crystalline salt;
   (e) directing saturated salt solution from the salt tank into a salt metering tank;
   (f) maintaining a predetermined quantity of saturated salt solution in the salt metering tank;
   (g) directing a quantity of a substantially saturated salt solution into the circulating mineral-containing salt solution so as to maintain the salt concentration thereof in the range of 2% to 25%;
   (h) directing the partially demineralized salt solution from the electrodialysis stack means back through the electrodialysis stack means as the circulating mineral-containing salt solution;
   (i) circulating the base solution from the base receiving tank through the electrodialysis stack means and back into the base receiving tank to increase the concentration thereof;
   (j) circulating the acid solution from the acid receiving tank through the electrodialysis stack means and back into the acid receiving tank to increase the concentration thereof;
   (k) monitoring the concentration of the base solution entering the base receiving tank and/or the acid solution entering the acid receiving tank;
   (l) periodically withdrawing the acid solution from the acid receiving tank and the base solution from the base receiving tank when the concentration of the base solution and/or acid solution reaches a predetermined level;
   (m) terminating the withdrawal of the acid solution and base solution in step (l);
   (n) directing a liquid into the corresponding receiving tanks to reduce the concentration of the circulating acid solution and the circulating base solution; and
   (o) contacting a regeneratable ion-exchange resin with an effective amount of acid regenerant delivered from the acid receiving tank or base regenerant delivered from the base receiving tank, or both, to regenerate the ion-exchange resin and thereby produce a salt-containing waste regenerant.

72. A method for regenerating an ion-exchange resin, comprising:
   (a) continuously circulating a mineral-containing salt solution through an electrodialysis stack means to produce a partially demineralized salt solution, an acid solution and a base solution;
   (b) directing the acid solution to an acid receiving tank;
   (c) directing the base solution to a base receiving tank;
   (d) passing a quantity of a substantially saturated salt solution through a softener to remove multi-valent ions therefrom and directing same into the circulating mineral-containing salt solution so as to maintain the salt concentration thereof in the range of 2% to 25%;
   (e) directing the partially demineralized salt solution from the electrodialysis stack means back through the electrodialysis stack means as the circulating mineral-containing salt solution;
   (f) circulating the base solution from the base receiving tank through the electrodialysis stack means and back into the base receiving tank to increase the concentration thereof;
   (g) circulating the acid solution from the acid receiving tank through the electrodialysis stack means and back into the acid receiving tank to increase the concentration thereof;
   (h) monitoring the concentration of the base solution entering the base receiving tank and/or the acid solution entering the acid receiving tank;
   (i) periodically withdrawing the acid solution from the acid receiving tank and the base solution from the base receiving tank when the concentration of the base solution and/or acid solution reaches a predetermined level;
   (j) terminating the withdrawal of the acid solution and base solution in step (i);
   (k) directing a liquid into the corresponding receiving tanks to reduce the concentration of the circulating acid solution and the circulating base solution; and
   (l) contacting a regeneratable ion-exchange resin with an effective amount of acid regenerant delivered from the acid receiving tank or base regenerant delivered from the base receiving tank, or both to regenerate the ion-exchange resin and thereby produce a salt-containing waste regenerant.

73. The methods as defined in claims 24, 67, 68, 50, 61, 69, 70, 71 or 72 wherein the electrodialysis stack means includes a bipolar membrane.

* * * * *